Figure 1:
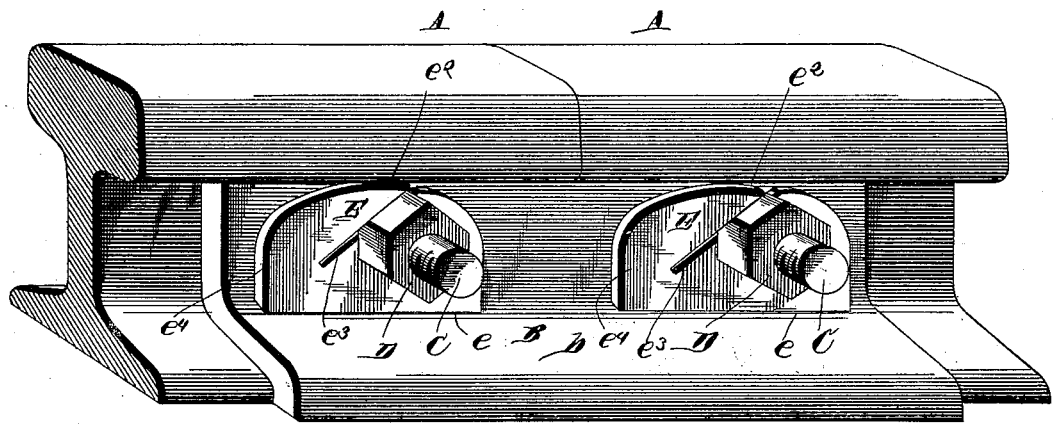

(No Model.)

G. P. FULLER.
NUT LOCK.

No. 404,530. Patented June 4, 1889.

Witnesses,
C. L. Taylor,
H. F. Riley

Inventor,
Geo. P. Fuller
By his Attorneys
C. A. Snowden

N. PETERS, Photo-Lithographer, Washington, D.C.

UNITED STATES PATENT OFFICE.

GEORGE PLINY FULLER, OF MINNEAPOLIS, MINNESOTA.

NUT-LOCK.

SPECIFICATION forming part of Letters Patent No. 404,530, dated June 4, 1889.

Application filed June 4, 1888. Serial No. 276,160. (No model.)

*To all whom it may concern:*

Be it known that I, GEORGE PLINY FULLER, a citizen of the United States, residing at Minneapolis, in the county of Hennepin and State of Minnesota, have invented new and useful Improvements in Nut-Locks, of which the following is a specification.

The invention relates to improvements in nut-locks. Heretofore nut-locks have been constructed with raised spring-tongues adapted to spring up automatically and check the return of the nuts, and these have generally been made on a continuous bar of steel and designed to lock two or more nuts; or when intended to lock a single nut the tongues have been constructed on square washers. These prior devices have all been tested and found to be impracticable for use in locking "hexagon" nuts, though they will doubtless answer all the purposes in locking "square" nuts. The light steel spring-tongues heretofore in use have proven insufficient as a self-acting spring-lock for hexagon nuts, which are extensively in use on railroads, because as soon as a nut has been in use there is formed all around the edges adjacent to the locking device a wire edge, which, especially on a hexagon nut, is sufficiently wide and strong to hold down a light and short spring-tongue, so that the tongue cannot fly up to present resistance to the sides of the nut to prevent the nut turning off the bolt; but steel sufficiently strong and heavy to be effective cannot be used unless a long slot and tongue are employed to produce the requisite elasticity for the tongue, as a short lip or point, such as is and only could be used in a continuous steel bar, would not in a heavy bar be sufficiently flexible and would constantly be liable to break in turning on the nut, or else it would plow off the corners of the nut as fast as they went over it. These long heavy steel tongues cannot be formed in a continuous bar of steel long enough to lock two or more nuts, because such heavy steel is required that it is indispensable to secure at all times safe and reliable action of the long spring-tongue that the left-hand or tongue portion of the plate of which it forms a part should be disconnected from any neighboring nut or locking-plate in order that it may be free to swing outward, and so relieve the otherwise excessive strain upon the metal of the tongue while being repeatedly depressed by the corners of the nut passing over it in being screwed home, and also to prevent the otherwise too rigid tongue from cutting away the corners of the nut. Again, such tongue would not be adapted for reliable use, and would prove ineffectual if formed in a square washer of spring-steel, as it would be too short; or, if the slot were cut down far enough to make the tongue sufficiently long and elastic, the metal would crack or break off at the lower end of the slot as soon as an attempt was made to depress the tongue in turning the nut to its place on the bolt.

The object of the present invention is to produce a device of cheap and uncomplicated construction that will obviate the above difficulties and be capable of locking with absolute certainty all nuts, and especially those known as the "hexagon" nuts, which are employed now on rails subject to the rapid transit of heavy trains to the exclusion of square nuts.

The invention consists in the novel combination and arrangement of the parts hereinafter fully described, illustrated in the accompanying drawings, and pointed out in the claims hereto appended.

Figure 2:
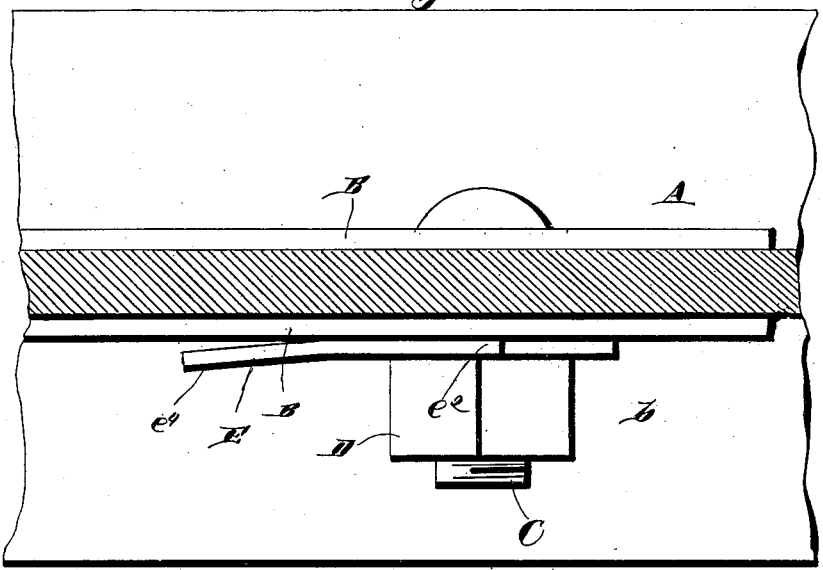
Figure 3:
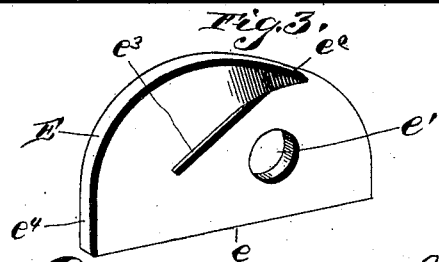

In the accompanying drawings, Figure 1 is a perspective view of a nut-locking device constructed in accordance with this invention, illustrating it applied in position to a rail-joint to prevent the turning off of a nut. Fig. 2 is a transverse sectional view illustrating the position of the free end of the nut-locking plate when the tongue is depressed by a corner of a nut. Fig. 3 is a detail view of the nut-locking plate.

Referring to the drawings, A designates a rail-joint of the usual construction. The fish-plates B are arranged on opposite sides of the rail, to which they are connected by a bolt C, of ordinary construction, which passes through aligned openings in the fish-plates B and the rail A, and by means of a nut D secures the parts together.

To lock the nut D and prevent it turning off the bolt C after being screwed in place, the locking-plate E, consisting of an elongated piece of spring metal and having its lower edge $e$ straight and resting upon the flange $b$ of the fish-plate B, prevents vertical movement during the turning of the nut D. Instead of having the edge $e$ of the locking-plate E resting upon the flange $b$ of the fish-plate B, the locking-plate may be constructed wider and may bear upon the flange of the rail A. Both of these features are old in the art and do not require special illustration.

The locking-plate E is placed between the fish-plate B and the nut D, the bolt C passing through an opening or bolt-hole $e'$ made near the right-hand end of the locking-plate. The opening or bolt-hole $e'$ is made to fit snugly the bolt, for if it were elongated or otherwise enlarged the bolt C could move, and a tongue $e^2$, formed in the locking-plate E, would be carried out of engagement with the nut and the device rendered inoperative. The locking-plate is constructed of strong and heavy spring metal, and is provided with a downward-inclined kerf-slot $e^3$, which forms the tongue $e^2$. By constructing the locking-plate of a heavy spring-plate of steel and having the tongue long, and constructed as hereinafter described, said tongue $e^2$ readily shears off the wire edge or burr projecting from the edges of the under sides of nuts that have been in use for any time on a railroad, and is enabled to spring up and check the return of the nut. The slot $e^3$ stands at an angle of about thirty degrees, and extends at that inclination nearly half-way down the locking-plate.

The long band of steel E is employed in order that the downward-inclined kerf-slot may be of considerable length to form a long tongue $e^2$, whereby the said tongue $e^2$ is rendered sufficiently flexible to prevent any liability of breakage and to keep it from plowing off the corners of the nut as they pass over it during the turning of the nut. The tongue $e^2$ is bent slightly outward at a point between its farthest end and the place where the corners of the nut first come in contact with it as they pass over the main body of the locking-plate E, in order that the corners will pass onto the spring-tongue $e^2$ without obstruction. At the same time enough of the spring-tongue is turned up to check the return of the nut, which is held from so doing by the edge and point of the tongue. The left-hand end $e^4$ of the locking-plate, or the end forming the base of the spring-tongue, is considerably elongated and left free, and is not connected to any neighboring locking plate or nut, as it is absolutely indispensable to the successful operation of the device that the end $e^4$ be free to spring outward, in order to relieve the otherwise excessive strain upon the metal of the curved tongue $e^2$ while being repeatedly depressed by the corners of the nut passing over it when the nut is being screwed home. The upper left-hand corner of the tongue is rounded off, in order to lighten it and enable it to spring out with greater ease, and the corresponding corner at the other end of the nut is rounded off to make it conform with the other end.

From the foregoing description and the accompanying drawings it will clearly be seen that locking devices constructed as described will offer a positive and reliable resistance against the sides of nuts and prevent their turning, and that such devices are adapted for use upon railroads subject to the transit of the fastest and heaviest trains.

Having thus described my invention, I claim—

1. A locking-plate for single nuts, constructed of heavy spring metal adapted to be secured beneath a nut to be locked and having an elongated end provided with a kerf-slit, forming a spring-tongue designed to engage the side of a nut, said elongated end being entirely free of any connection so as to be capable of springing outward upon depression of the tongue, substantially as and for the purpose described.

2. A locking-plate for single nuts, constructed of heavy spring metal adapted to be secured beneath a nut to be locked and having an elongated end located on one side of the nut and entirely free of any connection, and provided with a spring-tongue and capable of springing out upon depression of the tongue, said tongue being rounded off, whereby the elongated end is enabled to spring out with greater ease and readiness, substantially as and for the purpose described.

3. A locking-plate to lock single nuts made of heavy spring metal and provided with an opening so as to enable the plate to fit snugly on the bolt between the nut and the fish-plate, said plate being provided with a long slot extending at an angle less than a right angle to the nut, which slot extends nearly (more or less) half-way down the plate so as to form a tongue or lip, the end of which is turned outward from the point where the nut first touches the tongue, and the end of the plate on that side where the tongue is located being extended or elongated and left free of any connection, for the purpose set forth.

In testimony that I claim the foregoing as my own I have hereto affixed my signature in presence of two witnesses.

GEORGE PLINY FULLER.

Witnesses:
E. G. SIGGERS,
J. H. SIGGERS.